United States Patent
Orlovas et al.

(10) Patent No.: US 11,765,232 B1
(45) Date of Patent: *Sep. 19, 2023

(54) COMMUNICATION FUNCTIONS IN A MESH NETWORK

(71) Applicant: UAB 360 IT, Vilnius (LT)

(72) Inventors: Benas Orlovas, Jonavos r. (LT); Kristupas Antanavičius, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,176

(22) Filed: Aug. 15, 2022

Related U.S. Application Data

(63) Continuation of application No. 17/887,443, filed on Aug. 13, 2022.

(51) Int. Cl.
*H04L 29/06* (2006.01)
*H04L 67/12* (2022.01)
*H04L 41/08* (2022.01)
*H04L 69/321* (2022.01)

(52) U.S. Cl.
CPC .............. *H04L 67/12* (2013.01); *H04L 41/08* (2013.01); *H04L 69/321* (2013.01)

(58) Field of Classification Search
CPC ........ H04L 67/12; H04L 41/08; H04L 69/321
See application file for complete search history.

(56) References Cited

U.S. PATENT DOCUMENTS

| | | | |
|---|---|---|---|
| 2003/0220835 A1 | 11/2003 | Barnes, Jr. | |
| 2008/0069118 A1 | 3/2008 | Monier | |
| 2018/0124072 A1 | 5/2018 | Hamdi | |
| 2022/0124043 A1* | 4/2022 | Zhu | H04L 47/2483 |
| 2022/0345931 A1* | 10/2022 | Svennebring | H04W 4/24 |

* cited by examiner

*Primary Examiner* — Kim T Nguyen
(74) *Attorney, Agent, or Firm* — The Pattani Law Group

(57) ABSTRACT

A method including configuring an intermediate layer included in a network stack associated with an infrastructure device to: receive a request from a first device in a mesh network, the request requesting the infrastructure device to determine a communication parameter associated with communicating meshnet data with the first device; determine the communication parameter based at least in part on information included in the request; and transmit identification information identifying the communication parameter to an application layer included in the network stack; configuring the application layer to determine a response including an encrypted meshnet packet including the identification information; and transmitting, by the infrastructure device, the response to a second device in the mesh network is disclosed. Various other aspects are contemplated.

20 Claims, 9 Drawing Sheets

800

810 — Configuring an intermediate layer included in a network stack associated with an infrastructure device to:
receive a request from a first device in a mesh network, the request requesting the infrastructure device to determine a communication parameter associated with communicating meshnet data with the first device;
determine the communication parameter based at least in part on information included in the request; and
transmit identification information identifying the communication parameter to an application layer included in the network stack 820 — Configuring the application layer to determine a response including an encrypted meshnet packet including the identification information 830 — Transmitting, by the infrastructure device, the response to a second device in the mesh network

FIG. 8

COMMUNICATION FUNCTIONS IN A MESH NETWORK

CROSS REFERENCE

This application is a continuation of U.S. Non-Provisional patent application Ser. No. 17/887,443, filed on Aug. 13, 2022, and titled "Communication Functions In A Mesh Network," the entire contents of which are incorporated herein by reference.

FIELD OF DISCLOSURE

Aspects of the present disclosure generally relate to communications in networks, and more particularly to communication functions in a mesh network.

BACKGROUND

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

SUMMARY

In one aspect, the present disclosure contemplates a method including receiving, at an infrastructure device from a first device in a mesh network, a request to determine a communication parameter associated with communicating meshnet data with the first device; configuring a transport layer included in a network stack associated with the infrastructure device to determine the communication parameter and to transmit identification information indicating the communication parameter to an application layer included in the network stack; configuring the application layer to determine a response including the identification information; and transmitting, by the infrastructure device, the response to the first device.

In another aspect, the present disclosure contemplates an infrastructure device including a memory and a processor configured to: receive, from a first device in a mesh network, a request to determine a communication parameter associated with communicating meshnet data with the first device; configure a transport layer included in a network stack associated with the infrastructure device to determine the communication parameter and to transmit identification information indicating the communication parameter to an application layer included in the network stack; configure the application layer to determine a response including the identification information; and transmit the response to the first device.

In another aspect, the present disclosure contemplates a non-transitory computer readable medium storing instructions, which when executed by a processor associated with an infrastructure device, cause the processor to: receive, from a first device in a mesh network, a request to determine a communication parameter associated with communicating meshnet data with the first device; configure a transport layer included in a network stack associated with the infrastructure device to determine the communication parameter and to transmit identification information indicating the communication parameter to an application layer included in the network stack; configure the application layer to determine a response including the identification information; and transmit the response to the first device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
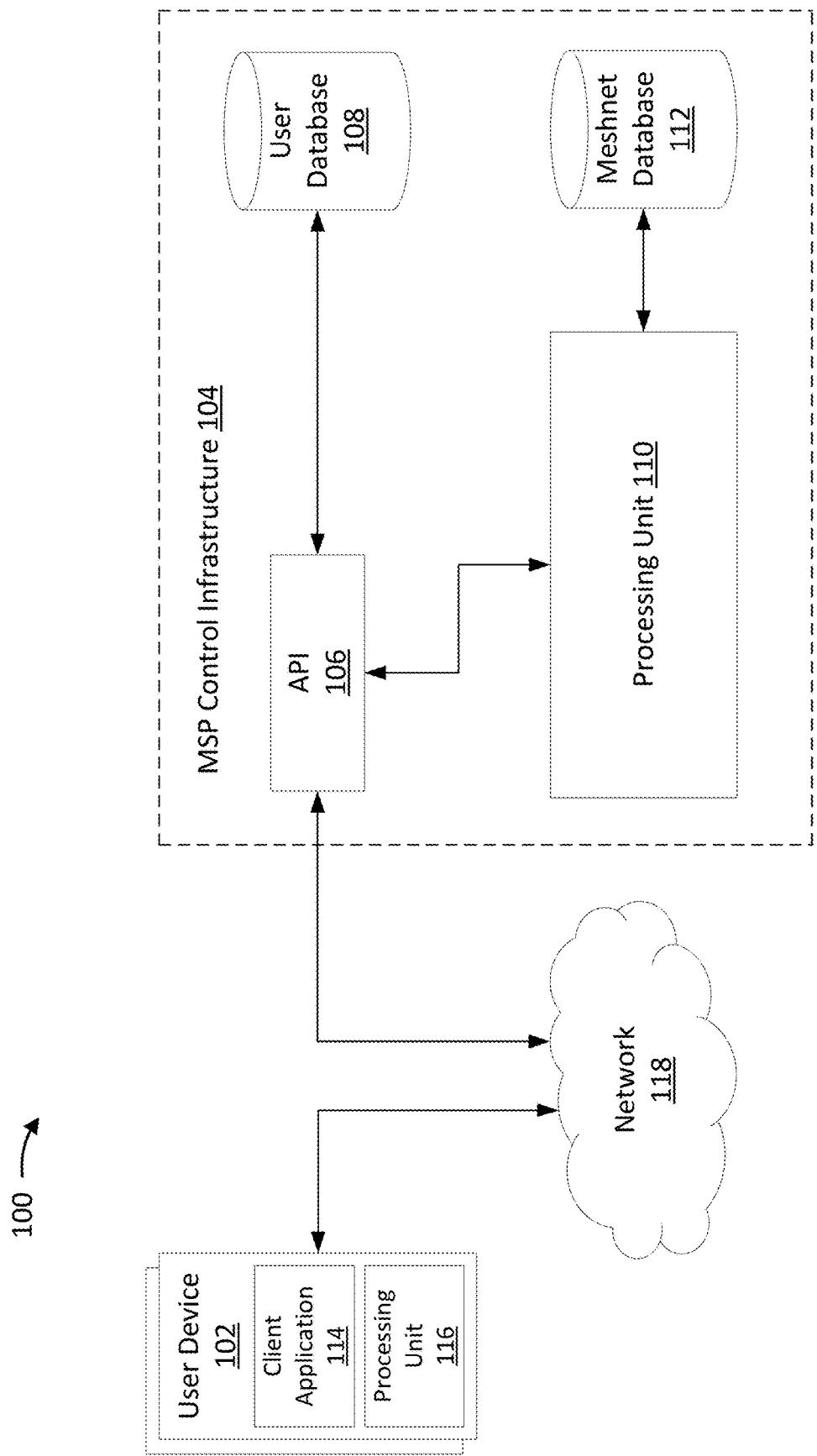

FIG. 1 is an illustration of an example system associated with communication functions in a mesh network, according to various aspects of the present disclosure.

Figure 2:
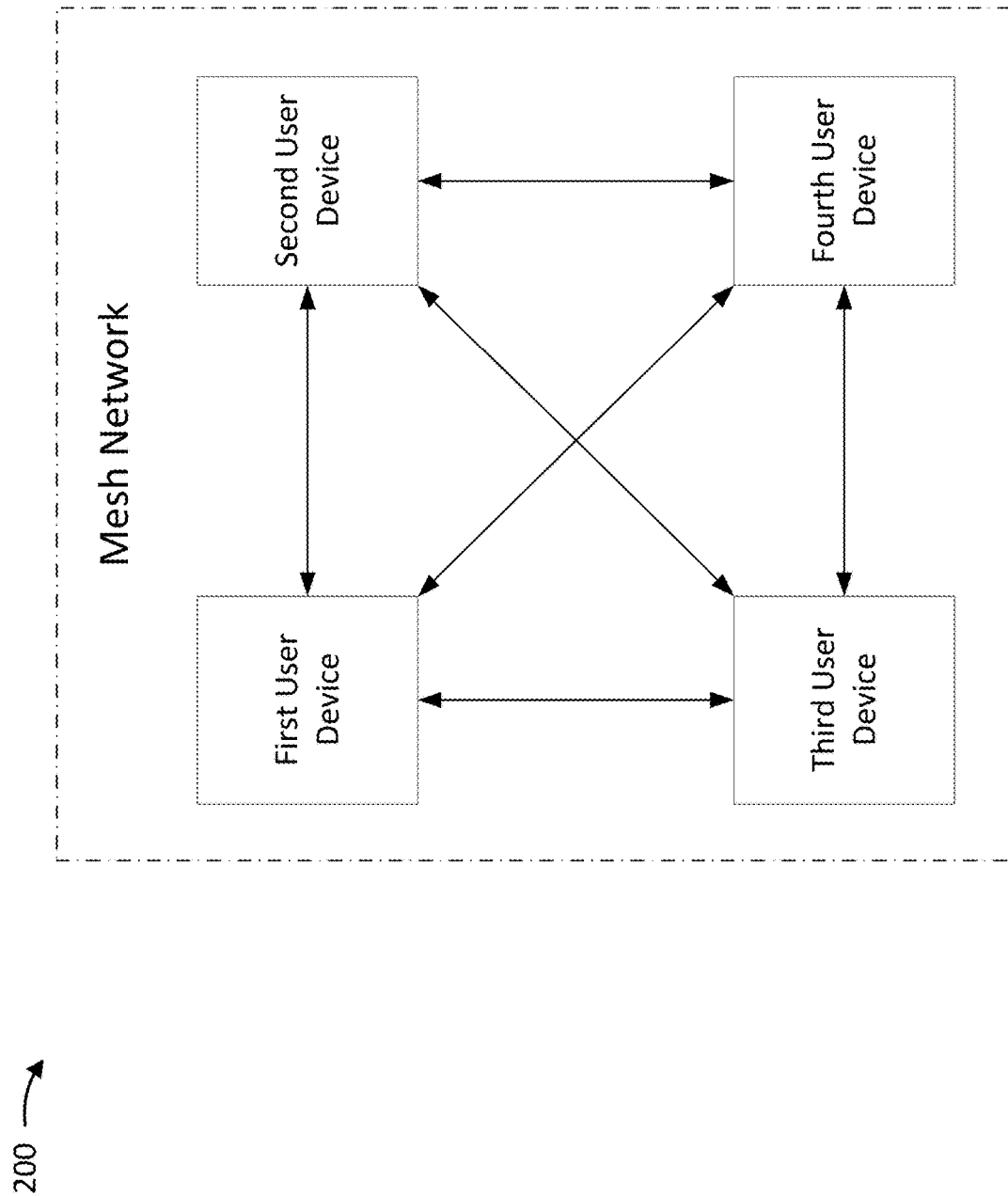

FIG. 2 is an illustration of an example associated with communication functions in a mesh network, according to various aspects of the present disclosure.

Figure 3A:
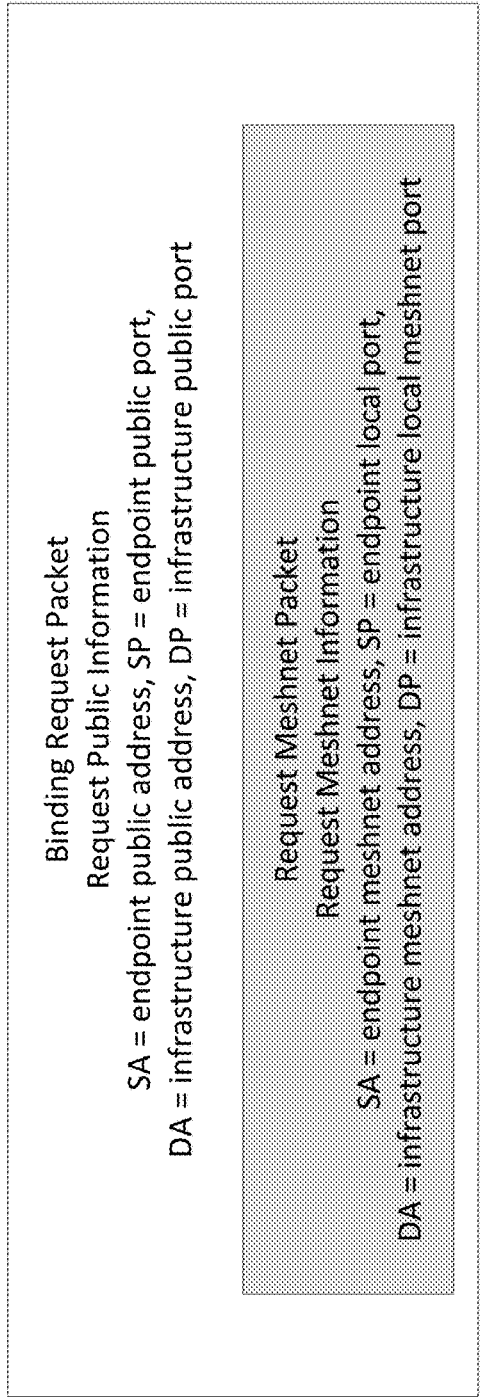
Figure 3B:
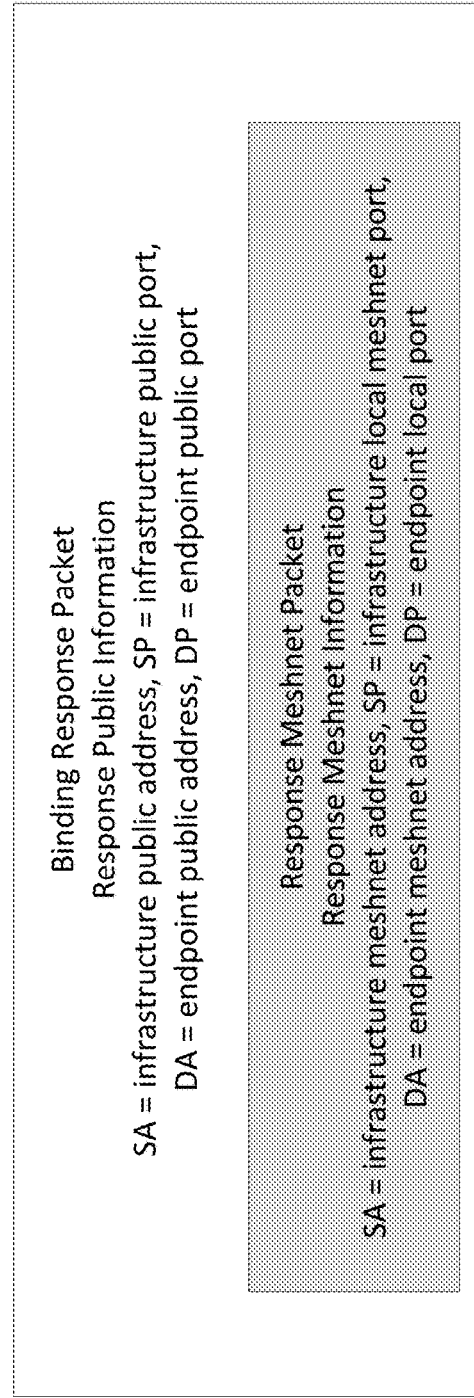

FIGS. 3A-3B are illustrations of examples associated with communication functions in a mesh network, according to various aspects of the present disclosure.

Figure 4:
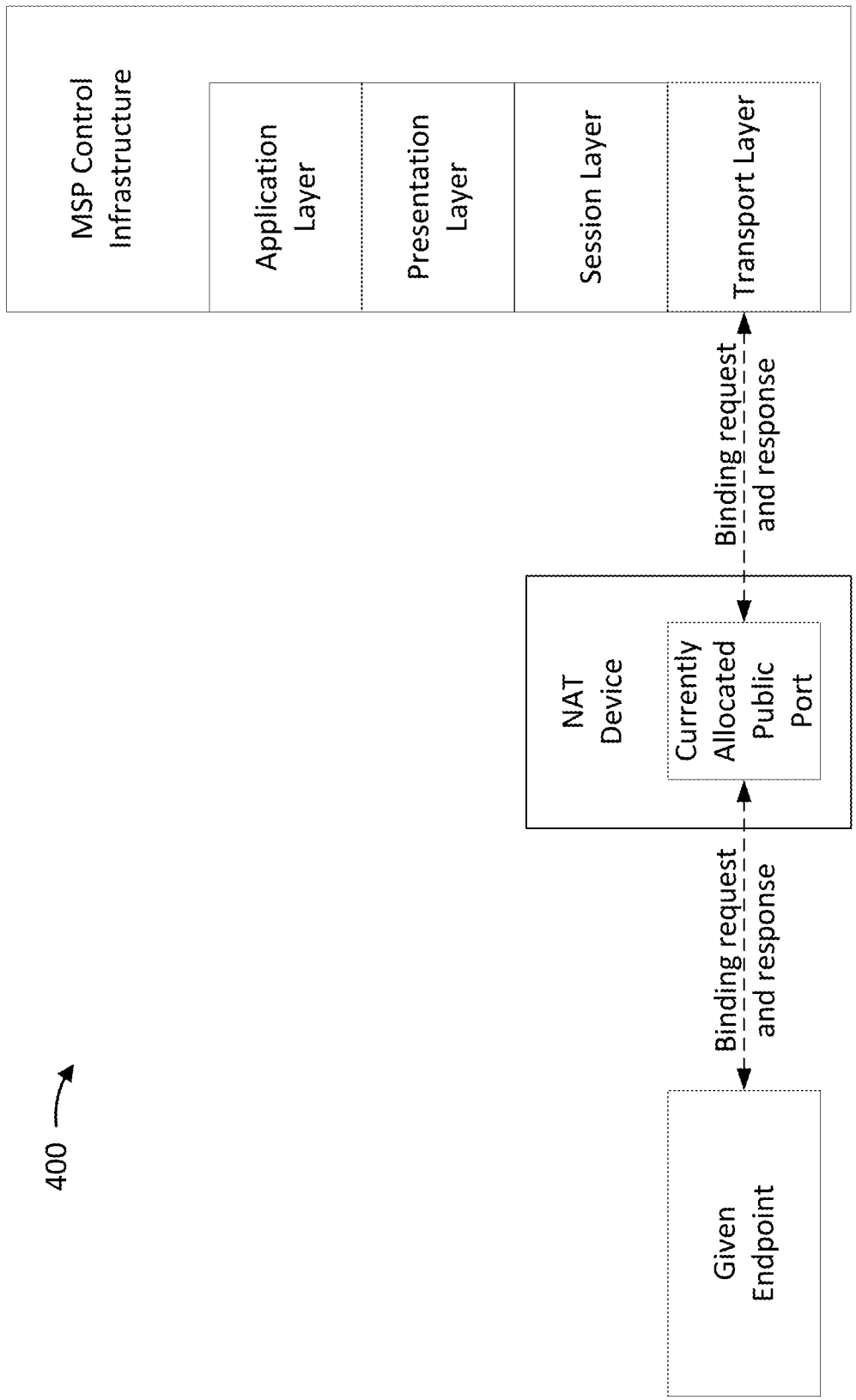

FIG. 4 is an illustration of an example associated with communication functions in a mesh network, according to various aspects of the present disclosure.

Figure 5:
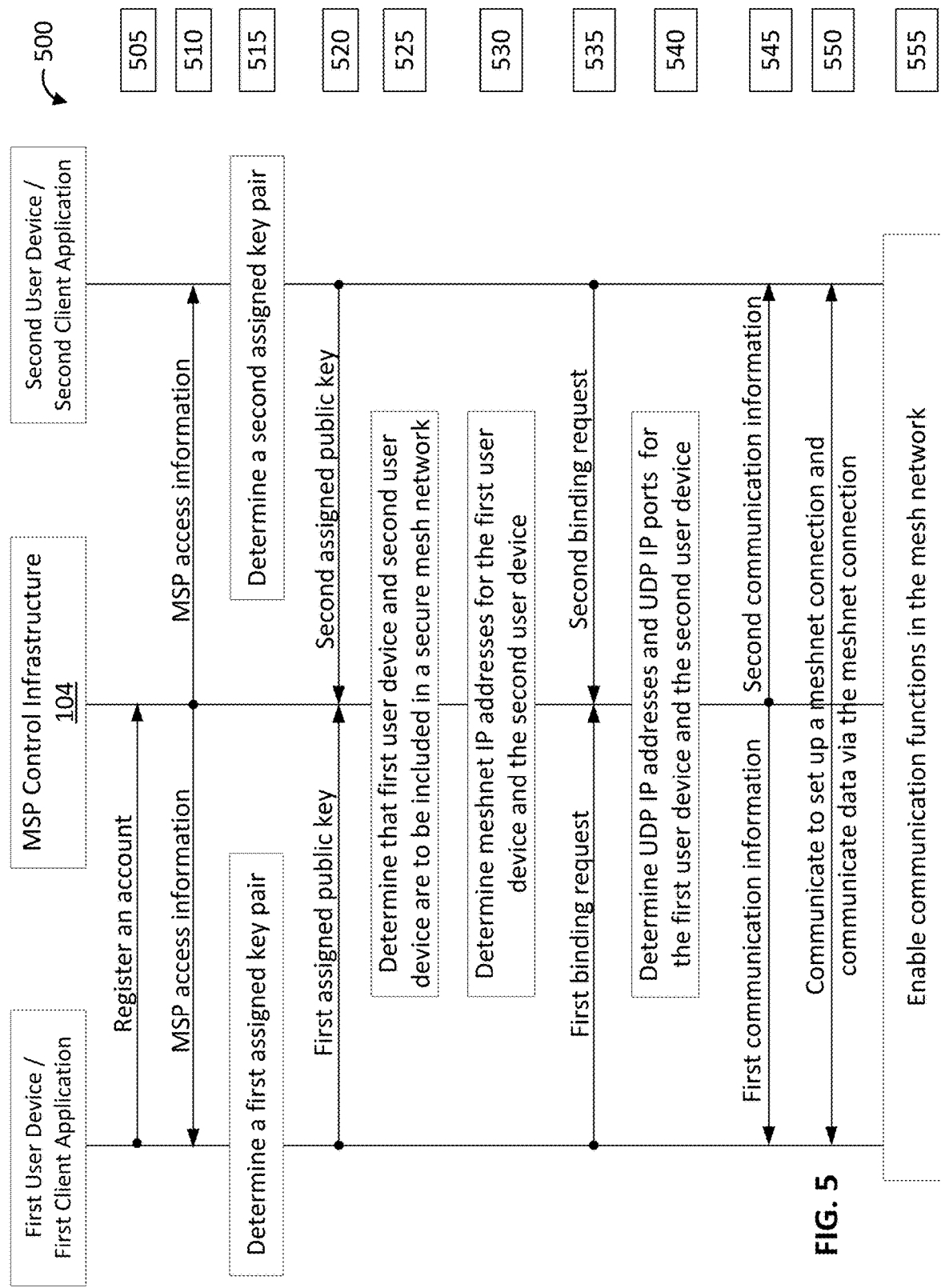

FIG. 5 is an illustration of an example flow associated with communication functions in a mesh network, according to various aspects of the present disclosure.

Figure 6:
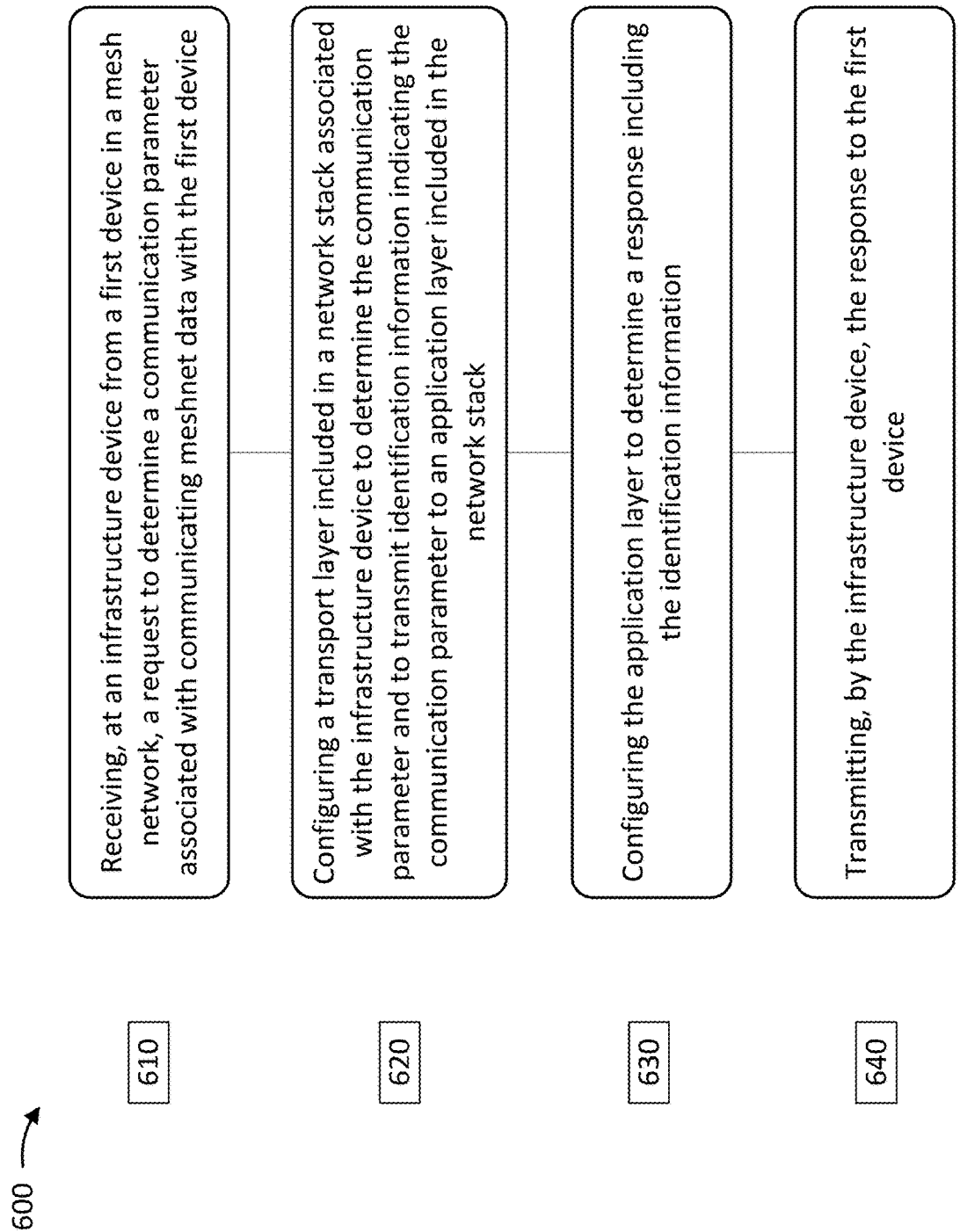

FIG. 6 is an illustration of an example process associated with communication functions in a mesh network, according to various aspects of the present disclosure.

Figure 7:
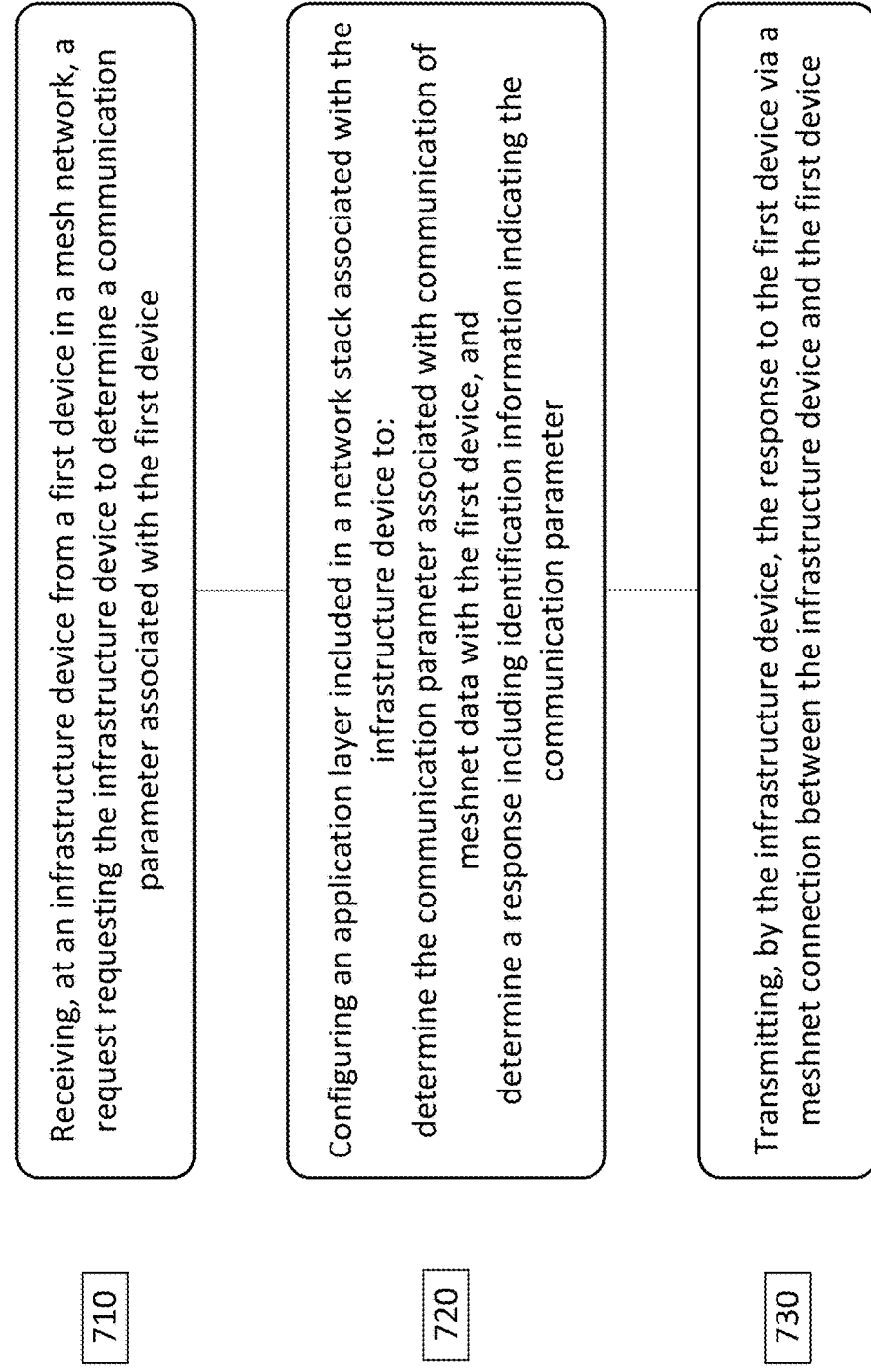

FIG. 7 is an illustration of an example process associated with communication functions in a mesh network, according to various aspects of the present disclosure.

FIG. 8 is an illustration of an example process associated with communication functions in a mesh network, according to various aspects of the present disclosure.

Figure 9:
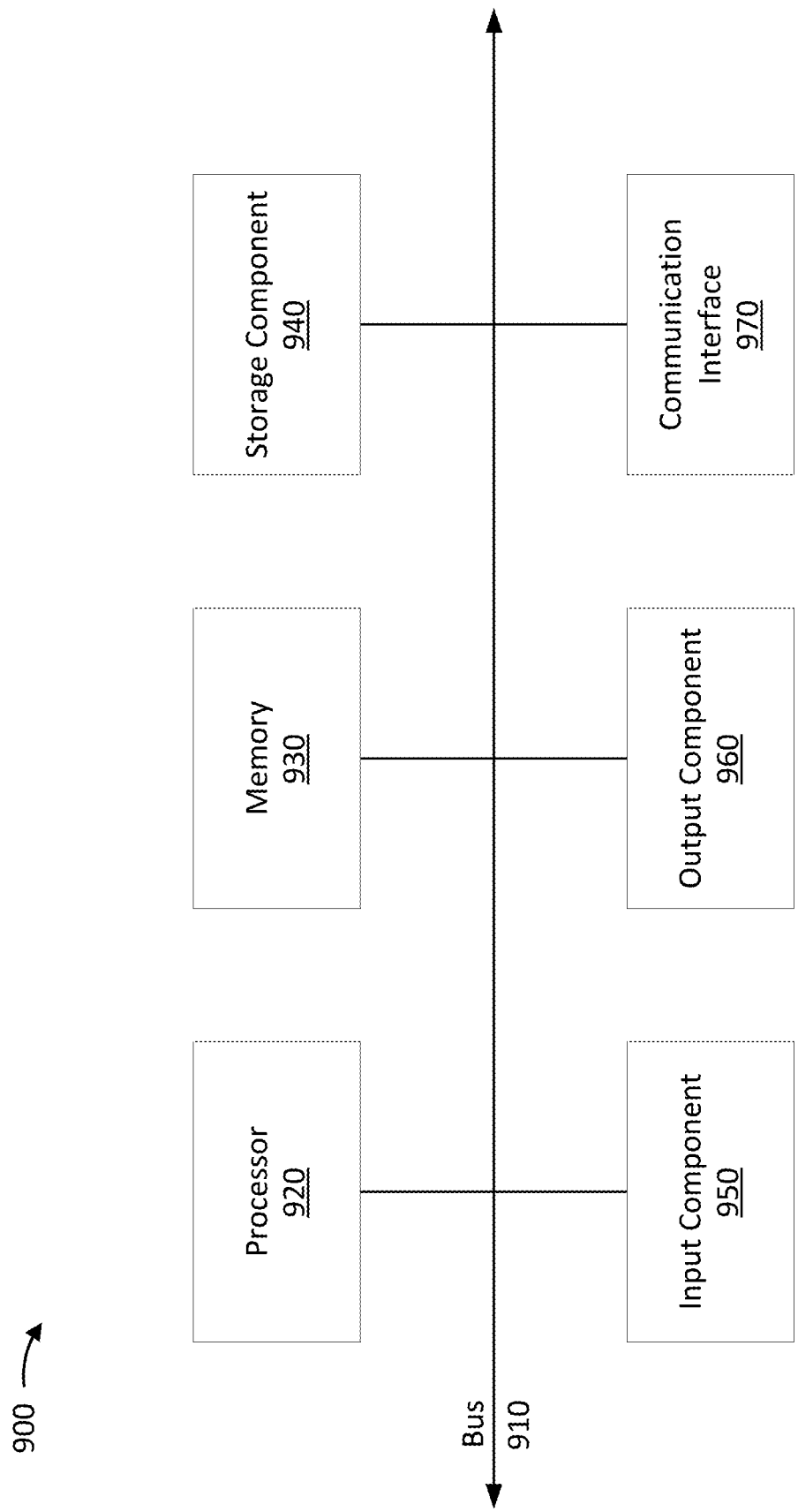

FIG. 9 is an illustration of example devices associated with communication functions in a mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with communication functions in a mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which is provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 9). For instance, the one or more components of the set of components may include or may be included in a controller/processor, a memory, or a combination thereof. In some aspects, the one or more of the components included in the MSP control infrastructure 104 may be separate and distinct from each other. Alternatively, in some aspects, the one or more of the components included in the MSP control infrastructure 104 may be combined with one or more of the other components. In some aspects, the one or more of the components included in the MSP control infrastructure 104 and/or the user device 102 may be local with respect to each other. Alternatively, in some aspects, one or more of the components included in the MSP control infrastructure 104 and/or the user device 102 may be located remotely with respect to one or more of other components included in the MSP control infrastructure 104 and/or the user device 102. Additionally, or alternatively, one or more components of the components included in the MSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

Endpoints (e.g., user devices) may rely on a mesh network to communicate (e.g., transmit and/or receive) meshnet data among the endpoints. In example 200 shown in FIG. 2, the endpoints may include a first user device, a second user device, a third user device, and/or a fourth user device. The meshnet data may be communicated using wired communications and/or wireless communications over a network such as, for example, the Internet. The meshnet data may include any information including digital information such as, for example, documents including data, voice data, image data, signal data, and/or video data. Further, the internal mesh network may be a secure mesh network that may enable the endpoints to communicate the meshnet data in encrypted form via meshnet connections (shown as double-ended arrows in FIG. 2).

A given endpoint may be associated with a given local area network (LAN) and may utilize a given local port to communicate the meshnet data. In turn, the given LAN may be associated with a given network address translation (NAT) device for conducting NAT procedures, including mapping the given local port with a given currently allocated public port (e.g., UDP port, TCP port, etc.). The given NAT device may route the meshnet data transmitted by the given local port to the given currently allocated public port (e.g., UDP port) and to another endpoint in the mesh network. Similarly, the given NAT device may receive meshnet data transmitted by another endpoint at the given currently allocated public port and may route the received meshnet data to the given local port.

In some cases, while conducting the NAT procedures for the given endpoint, the given NAT device may reallocate the given currently allocated public port for tasks other than routing the meshnet data and may allocate a different public port for routing the meshnet data. In this case, the given currently allocated public port may be referred to as a previously allocated public port and the different public port may be referred to as the currently allocated public port. Such reallocation may be due to lack of communication in the mesh network by the given endpoint for a threshold amount of time, or for a need that the previously allocated public port supports a task other than routing the meshnet data, or the like. Because the given endpoint and other endpoints in the mesh network are unaware of the above reallocation, the other endpoints may continue to communicate the meshnet data to the previously allocated public port. The given NAT device may drop and/or discard such communicated meshnet data. As a result, the given endpoint may fail to receive the communicated meshnet data.

To keep the given endpoint and other endpoints informed of reallocation of public ports by the given NAT device, the given endpoint may transmit a binding request to a control infrastructure. Based at least in part on receiving the binding request, the control infrastructure may determine the currently allocated public port (e.g., the different public port) associated with the given endpoint, and may communicate, to all endpoints in the mesh network, a binding response including communication information indicating that the different public port is the currently allocated public port. As a result, to continue to communicate with the given endpoint, the other endpoints in the mesh network may transmit meshnet data to the currently allocated public port (e.g., the different public port).

In some cases, the control infrastructure may be included in the mesh network (e.g., as an endpoint) and may communicate with the endpoints via respective meshnet connections. In this case, as shown in example 300 of FIG. 3A, the binding request transmitted by the given endpoint to the control infrastructure may include a binding request packet including, for example, a header indicating request public information. The request public information may include information indicating, for example, an endpoint public address (e.g., public IP address) associated with the given endpoint as a source address (SA), an endpoint public port (e.g., the currently allocated public port) associated with the given endpoint as a source port (SP), an infrastructure public address (e.g., public IP address) associated with the control infrastructure as a destination address (DA), and/or an infrastructure public port (e.g., public port) associated with the control infrastructure as a destination port (DP). A payload associated with the binding request packet may include an encrypted request meshnet packet including, for example, a header indicating request meshnet information. The request meshnet information may include information indicating, for example, an endpoint meshnet address (e.g., meshnet IP address) associated with the given endpoint as a source address (SA), an endpoint local port (e.g., a dedicated port for communicating meshnet data) associated with the given endpoint as a source port (SP), and infrastructure meshnet address (e.g., meshnet IP address) associated with the control infrastructure as a destination address (DA), and/or an infrastructure local meshnet port (e.g., a dedicated port for communicating meshnet data) associated with the control infrastructure as a destination port (DP). A payload associated with the request meshnet packet may include information requesting the control infrastructure to determine the currently allocated public port associated with the given endpoint.

The control infrastructure may determine the currently allocated public port associated with the given endpoint based at least in part on receiving and analyzing the binding request packet. In an example, the control infrastructure may analyze the header included in the binding request packet and determine that the indicated endpoint public port is the currently allocated public port. Based at least in part on determining the currently allocated port, the control infrastructure may determine a binding response to be transmitted to one or more endpoints included in the mesh network.

As shown in example 300 of FIG. 3B, the binding response transmitted by the control infrastructure to the one or more endpoints may include a binding response packet including, for example, a header indicating response public information. The response public information may include information indicating, for example, the infrastructure public address associated with the control infrastructure as the source address (SA), the infrastructure public port associated with the control infrastructure as the source port (SP), the endpoint public address associated with the given endpoint as the destination address (DA), and/or the endpoint public port associated with the given endpoint as the destination port (DP). A payload associated with the binding response packet may include an encrypted response meshnet packet including, for example, a header indicating response meshnet information. The response meshnet information may include information indicating, for example, the infrastructure meshnet address associated with the control infrastructure as the source address (SA), the infrastructure local meshnet port associated with the control infrastructure as the source port (SP), the endpoint meshnet address associated with the given endpoint as the destination address (DA), and/or the endpoint local port associated with the given endpoint as the destination port (DP).

The control infrastructure may attempt to include, in a meshnet payload associated with the response meshnet packet, identification information identifying the endpoint public port as the currently allocated public port associated with the given endpoint. In some cases, the control infrastructure may fail to include the identification information in the meshnet payload because the control infrastructure may determine the response meshnet packet (including the meshnet payload) utilizing a client application at an application layer, which may not have access to the identification information. In some aspects, the application layer may be included in a network stack associated with the control infrastructure. For instance, as shown in FIG. 4, the control infrastructure may receive the binding request at a transport layer included in the network stack associated with the control infrastructure. The transport layer and/or a session layer and/or a presentation layer may analyze the request public information in the binding request packet and may extract the encrypted request meshnet packet from the payload thereof, and may provide the encrypted request meshnet packet to the application layer. The application layer may utilize an application to decrypt the encrypted request meshnet packet.

Based at least in part on decrypting the encrypted request meshnet packet, the application may determine that the control infrastructure is to determine the currently allocated public port associated with the given endpoint. In other words, the control infrastructure is to determine the identification information and to include the identification information in the payload associated with the response meshnet packet. Because the application is associated with the application layer that does not have access to the request public information included in the binding request packet, the application may fail to determine that the endpoint public port associated with the given endpoint is the currently allocated public port. As a result, the client application may fail to include, in the meshnet payload associated with the response meshnet packet, the identification information indicating that the endpoint public port associated with the given endpoint is the currently allocated public port.

In this case, the application may determine the meshnet payload without including the identification information. The application may determine the response meshnet packet including the meshnet payload, and may encrypt and transfer the encrypted response meshnet packet to the presentation layer or the session layer or the transport layer. Based at least in part on receiving the response meshnet packet, the presentation layer and/or the session layer and/or the transport layer may determine the binding response packet.

The transport layer may transmit the binding response packet to the one or more endpoints without including the identification information. Because the endpoints fail to receive the identification information, the endpoints may fail to determine that the different public port is the currently allocated public port associated with the given endpoint. In this case, the endpoints may continue to utilize the previously allocated public port to communicate meshnet data with the given endpoint. The given NAT device may drop the meshnet data communicated at the previously allocated public port.

As a result, the given endpoint may fail to receive the meshnet data, and communication among the endpoints may be interrupted. Further, the other endpoints may retransmit the communications to the given endpoint to ensure receipt thereof by the given endpoint. Such transmission and retransmission of communications may inefficiently consume user device resources (e.g., processing resources, memory resources, power consumption resources, battery life, or the like) and the network resources (computational resources, network bandwidth, management resources, processing resources, memory resources, or the like) that can otherwise be utilized to perform suitable tasks associated with the mesh network. The above discussion with respect to the given endpoint may also apply to the one or more other endpoints in the mesh network.

Various aspects of systems and techniques discussed in the present disclosure enable communication functions in a mesh network. In some aspects, an MSP control infrastructure may provide the mesh network to enable endpoints to securely communicate meshnet data. Further, the MSP control infrastructure may provide the endpoints with respective client applications to communicate with the MSP control infrastructure, to communicate with each other for setting up respective meshnet connections to be utilized for communicating meshnet data in the mesh network, and/or to communicate the meshnet data (e.g., meshnet communications) with each other over the respective meshnet connections. The MSP control infrastructure and the respective client applications may also enable communication functions in the mesh network. In some aspects, the MSP control infrastructure may configure a network stack associated with the MSP control infrastructure to utilize a transport layer and/or a session layer and/or a presentation layer to determine identification information that identifies a currently allocated public port associated with a given endpoint. Further, the MSP control infrastructure may configure the network stack to utilize the transport layer and/or the session layer and/or the presentation layer to transmit the determined identification information to the application layer. In an example, the transport layer and/or the session layer and/or the presentation layer may transmit the determined identification information to the application layer along with an encrypted meshnet packet (received in a binding request). In this way, the application layer may have access to the identification information, and, therefore, be capable of including the identification information in a meshnet payload associated with a response meshnet packet. The application layer may encrypt and transmit the response meshnet packet to the transport layer and/or the session layer and/or the presentation layer, which may determine the binding response packet including the encrypted response meshnet packet. As a result, the MSP control infrastructure may transmit the binding response packet including the encrypted response meshnet packet that includes the identification information to one or more endpoints in the mesh network.

Based at least in part on receiving the identification information, the one or more endpoints may utilize the identified currently allocated public port to continue to communicate meshnet data with the given endpoint. A given NAT device associated with the given endpoint may accept and route such meshnet data communicated at the currently allocated public port to the given endpoint, and communication among the endpoints may continue uninterrupted. Further, instances of inefficient transmissions and retransmissions of communications among the endpoints may be mitigated. As a result, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for performing suitable tasks associated with the mesh network.

In some aspects, a processor (e.g., processing unit 110, processor 920) associated with an MSP control infrastructure may receive, from a first device in a mesh network, a request to determine a communication parameter associated with communicating meshnet data with the first device; configure a transport layer included in a network stack associated with the infrastructure device to determine the communication parameter and to transmit identification information indicating the communication parameter to an application layer included in the network stack; configure the application layer to determine a response including the identification information; and transmit the response to the first device.

As indicated above, FIGS. 2-4 are provided as examples. Other examples may differ from what is described with regard to FIGS. 2-4.

FIG. 5 is an illustration of an example flow 500 associated with communication functions in a mesh network, according to various aspects of the present disclosure. The example flow 500 may include a first user device (e.g., first endpoint), MSP control infrastructure 104, and a second user device (e.g., second endpoint) in communication with each other. The first user device and the second user device may be similar to a user device 102 discussed above with respect to FIG. 1. In some aspects, the first user device and the second user device may be associated with a single account registered with the MSP control infrastructure 104. In some aspects, the first user device and the second user device may be associated with different accounts registered with the MSP control infrastructure 104. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other.

The first user device may install a first client application (e.g., client application 104) and the second user device may install a second client application (e.g., client application 104), the first client application and the second client application being associated with (e.g., provided by) the MSP control infrastructure 104. The first user device and the second user device may use the respective client applications to communicate with an application programming interface (API) and/or a processor (e.g., processing unit 110, processor 920) associated with the MSP control infrastructure 104. In some aspects, the first user device, the MSP control infrastructure 104, and the second user device may communicate with each other over a network (e.g., network 118). As discussed elsewhere herein, the MSP control infrastructure 104 may enable the first user device and/or the second user device to obtain the mesh network services.

In some aspects, the client applications may enable the user devices to receive information to be processed by the client applications and/or by the MSP control infrastructure 104. Each of the client applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration), the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the information to the MSP control infrastructure 104. In some aspects, the first client application may utilize a first processing unit (e.g., processing unit 116, processor 920) associated with the first user device to perform processes/operations associated with obtaining the mesh network services and the second application may utilize a second processing unit (e.g., processing unit 116, processor 920) associated with the second user device to perform processes/operations associated with obtaining the mesh network services.

Although only two user devices (e.g., endpoints) are shown in FIG. 5, the present disclosure contemplates the mesh network to include any number of user devices that perform the processes discussed herein in a similar and/or analogous manner. For instance, the mesh network may include a third user device and a fourth user device, as discussed above with respect to FIG. 2, that perform the processes discussed herein in a similar and/or analogous manner. Further, user devices may leave or join the mesh network in an ad-hoc manner.

As shown by reference numeral 505, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other user devices (e.g., second user device) associated with the first user device to enable the other user devices to utilize the login information to gain access to the MSP control infrastructure 104 via the registered account. In some aspects, a given user device may be associated with the first user device because the given user device may be available to a user/owner of the first user device. In some aspects, when the second user device is not associated with the registered account associated with the first user device, the second user device may register a different account with the MSP control infrastructure 104.

In some aspects, the first user device and the second user device may utilize the login information to access the registered account/accounts to communicate with the MSP control infrastructure 104. As shown by reference numeral 510, based at least in part on the first user device and the second user device accessing the registered account/accounts to communicate with the MSP control infrastructure 104, the MSP control infrastructure 104 may transmit, and the first client application and the second client application may receive, MSP access information. In some aspects, the MSP access information may include transmission control protocol (TCP) access information and/or UDP access information. The TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first user device and the second user device may utilize the infrastructure UDP IP address and the infrastructure UDP port to communicate meshnet data with the MSP control infrastructure 104.

As shown by reference numeral 515, the first client application and the second client application may determine information based at least in part on the registration of the account/accounts with the MSP Control Infrastructure 104. In an example, the first client application may determine an asymmetric first assigned key pair associated with the first user device. The first assigned key pair may be unique to the first user device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine an asymmetric second assigned key pair associated with the second user device. The second assigned key pair may be unique to the second user device and may include a second assigned public key and a second assigned private key. In this way, the second assigned public key and the second assigned private key may be device-specific and maybe associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 520, the client applications may transmit, and the MSP control infrastructure 104 may receive, at least a portion of the information determined by the client applications. For instance, the first client application may transmit, for example, the first assigned public key to the MSP control infrastructure 104 and the second client application may transmit, for example, the second assigned public key to the MSP control infrastructure 104. The MSP control infrastructure 104 may store and correlate the received information in association with the registered account and/or with the respective user devices. In an example, the MSP control infrastructure 104 may store and correlate the first assigned public key in association with the registered account and the first user device, and may store and correlate the second assigned public key in association with the registered account and the second user device. In some aspects, the first client application and the second client application may utilize the infrastructure TCP IP address and the infrastructure TCP port to transmit the first assigned public key and the second assigned public key to the MSP control infrastructure 104 via the TCP.

Further, as shown by reference numeral 525, the MSP control infrastructure 104 may determine that the first user device and the second user device are to be included in the same mesh network. In some aspects, when the first user device and the second user device are associated with the same registered account, the MSP control infrastructure 104 may make such a determination regarding the secure mesh network based at least in part on determining that the first user device and the second user device are communicating with the MSP control infrastructure 104 by utilizing the login information associated with the same registered account. In some aspects, when the first user device and the second user device are associated with different registered accounts, the MSP control infrastructure 104 may make such a determination regarding the secure mesh network based at least in part on the first user device (and/or the second user device) providing information indicating that the first user device and the second user device are to be included in the same mesh network. Such information may include, for example, identification information (e.g., type of device, user name, email address, etc.) associated with the second user device (or the first user device), the second IP address (or the first IP address), or the like.

Based at least in part on determining that the first user device and the second user device are to be included in the same mesh network, as shown by reference numeral 530, the MSP control infrastructure 104 may determine meshnet IP addresses for the first user device and for the second user device. In an example, the MSP control infrastructure 104 may determine a first meshnet IP address associated with the first user device and a second meshnet IP address associated with the second user device. The first client application and/or another application installed on the first user device and/or the operating system associated with the first user device may utilize the first meshnet IP address and/or the first local meshnet port to communicate data with the endpoints over meshnet connections in the mesh network and the second user device may utilize the second meshnet IP address and/or the second local meshnet port to communicate data with the endpoints over the meshnet connections in the mesh network. In an example, with respect to communication between the first user device and the second user device, the first user device may determine a first meshnet IP packet indicating the first meshnet IP address as a source address, the first local meshnet port as a source port, the second meshnet IP address as a destination address, and the second local meshnet port as a destination port. The first user device may encrypt and encapsulate the first meshnet IP packet within a payload of a transmitted UDP IP packet. The second user device may receive the UDP IP packet, may decrypt the first meshnet IP packet, and may route the first meshnet IP packet to the second local meshnet port. Similarly, the second user device may determine a second meshnet IP packet indicating the second meshnet IP address as a source address, the second local meshnet port as a source port, the first meshnet IP address as a destination address, and the first local meshnet port as a destination port. The second user device may encrypt and encapsulate the second meshnet IP packet within a payload of a transmitted UDP IP packet. The first user device may receive the UDP IP packet, may decrypt the first meshnet IP packet, and may route the second meshnet IP packet to the first local meshnet port. The MSP control infrastructure 104 may determine the meshnet IP addresses from, for example, a pool of reserved IP addresses associated with an internal subnet of the ISP.

As shown by reference numeral 535, the first user device and the second user device may transmit, and the MSP control infrastructure 104 may receive, respective binding requests. In some aspects, the first user device may transmit the first binding request to the MSP control infrastructure 104 using the UDP by utilizing the UDP access information received from the MSP control infrastructure 104 (e.g., block 520). In this case, the first user device may transmit a first binding request to the MSP control infrastructure 104 to request the MSP control infrastructure 104 to determine a first public UDP IP address (e.g., communication address) and/or a first public UDP port (e.g., communication port) associated with the first user device. As discussed below in further detail, the first public UDP IP address and/or the first public UDP port are to be utilized by the second user device to communicate with the first user device in the mesh network. Similarly, the second user device may transmit the second binding request to the MSP control infrastructure 104 using the UDP by utilizing the UDP access information received from the MSP control infrastructure 104 (e.g., block 520). In this case, the second user device may transmit a second binding request to the MSP control infrastructure 104 to request the MSP control infrastructure 104 to determine a second public UDP IP address (e.g., communication address) and/or a second public UDP port (e.g., communication port) associated with the second user device. As discussed below in further detail, the second UDP IP address and/or the second UDP port are to be utilized by the first user device to communicate with the second user device in the mesh network.

In some aspects, the first public UDP IP address and/or the first public UDP port may be determined by a first NAT device responsible for managing operation of the first user device in a first local network. In an example, the first NAT device may translate a first local UDP IP address and/or a first local UDP port associated with the first user device to the first public UDP IP address and/or the first public UDP port that the first user device utilizes to communicate (e.g., transmit and/or receive) over the Internet using the UDP. Similarly, the second public UDP IP address and/or the second public UDP port may be determined by a second NAT device responsible for managing operation of the second user device in a second local network. In an example, the second NAT device may translate a second local UDP IP address and/or a second local UDP port associated with the second user device to the second public UDP IP address and/or the second public UDP port that the second user device utilized to communicate (e.g., transmit and/or receive) over the Internet using the UDP.

Based at least in part on receiving the respective binding requests, as shown by reference numeral 540, the MSP control infrastructure 104 may determine public UDP IP addresses and/or public UDP ports associated with the first user device and the second user device. In an example, based at least in part on receiving the first binding request, the MSP control infrastructure 104 may determine the first public UDP IP address and/or the first public UDP port associated with the first user device. In some aspects, the MSP control infrastructure 104 may determine the first public UDP IP address and/or the first public UDP port based at least in part on analyzing the UDP communication (e.g., UDP IP packet) including the first binding request received from the first user device. The UDP communication may include, for example, a header that indicates the first public UDP IP address as a source UDP IP address and/or the first public UDP port as a source UDP port associated with the first user device. Further, the MSP control infrastructure 104 may store and correlate the first public UDP IP address and/or the first UDP port in association with the first user device in, for example, the meshnet database 112. Similarly, based at least in part on receiving the second binding request, the MSP control infrastructure 104 may determine the second public UDP IP address and/or the second public UDP port associated with the second user device. In some aspects, the MSP control infrastructure 104 may determine the second public UDP IP address and/or the second public UDP port based at least in part on analyzing the UDP communication (e.g., UDP IP packet) including the second binding request received from the second user device. The UDP communication may include, for example, a header that indicates the second public UDP IP address as a source UDP IP address and/or the second public UDP port as a source UDP port associated with the second user device. Further, the MSP control infrastructure 104 may store and correlate the second public UDP IP address and/or the second public UDP port in association with the second user device in, for example, the meshnet database 112.

Based at least in part on determining the public UDP IP addresses and/or the public UDP ports, as shown by reference numeral 545, the MSP control infrastructure 104 may transmit, and the first client application and the second client application may receive, communication information. In an example, the MSP control infrastructure 104 may transmit, and the first client application may receive, first communication information including the first meshnet IP address associated with the first user device, the second meshnet IP address associated with the second user device, the second public UDP IP address and/or the second public UDP port associated with the second user device, and the second public key associated with the second user device. Similarly, the MSP control infrastructure 104 may transmit, and the second client application may receive, second communication information including the first public UDP IP address and/or the first public UDP port associated with the first user device, the first public key associated with the first user device, the first meshnet IP address associated with the first user device, and the second meshnet IP address associated with the second user device. As discussed below in further detail, the above transmission of communication information may enable the first user device and the second user device to communicate securely and privately in the mesh network.

As shown by reference numeral 550, the first client application and the second client application may communicate with each other directly to set up a meshnet connection (e.g., an encrypted tunnel) for communicating encrypted data in the hybrid mesh network. To set up the meshnet connection, the first client application may utilize the second assigned public key and/or the second public IP address (e.g., second UDP IP address) to securely (e.g., in encrypted form) communicate with the second client application, and the second client application may utilize the first assigned public key and/or the first public IP address (e.g., first UDP IP address) to securely communicate with the first client application. In some aspects, the first client application and the second client application may communicate to securely/privately negotiate parameters (e.g., a symmetric encryption/decryption key) associated with the meshnet connection. In some aspects, the parameters may be randomly generated to provide optimized security to the communications. In an example, the first client application and the second client application may privately negotiate a randomly generated symmetric key that is to be utilized by the first client application and the second client application for encrypting and decrypting data communicated via the meshnet connection. The randomly generated symmetric key may be determined based at least in part on any combination of the first public key, the second public key, and/or randomly generated numbers. Additionally, the first client application and the second client application may utilize a secure protocol (e.g., Wireguard, IP sec, etc.) to communicate the data via the meshnet connection.

Additionally, or alternatively, the first client application and the second client application may communicate with each other indirectly via, for example, a relay device (e.g., a relay server) to set up the meshnet connection. In an example, the first client application may provide the first assigned public key to a relay server, which may store an association of the first assigned public key with the first client application. In some aspects, the association may include an association between the first assigned public key and a first communication connection between the relay server and the first client application. Similarly, the second client application may provide the second assigned public key to the relay server, which may store an association of the second assigned public key with the second client application. In some aspects, the association may include an association between the second assigned public key and a second communication connection between the relay server and the first client application. The relay server may rely on the stored associations of public keys and client applications to determine a destination of a received message. In some aspects, the relay server may include a network of relay servers that enable the first client application and the second client application to communicate with each other. In this case, the first client application and the second client application may provide the respective assigned public keys to different relay servers included within the network of relay servers.

In some aspects, the first client application may transmit, to the relay server, a first message that is to be delivered to the second client application. Along with the first message, the first client application may transmit the second assigned public key. Further, the first client application may encrypt the first message utilizing the second assigned public key. In some aspects, the first client application may encrypt the first message based at least in part on utilizing the negotiated randomly generated symmetric key. Based at least in part on receiving the encrypted first message and the second assigned public key, the relay server may determine from stored associations that the second assigned public key is associated with the second client application. As a result, the relay server may determine that the first message is to be relayed (e.g., transmitted) to the second client application. Similarly, the second client application may transmit, to the relay server, a second message that is to be delivered to the first client application. Along with the second message, the second client application may transmit the first assigned public key. Further, the second client application may encrypt the second message utilizing the first assigned public key. In some aspects, the second client application may encrypt the second message based at least in part on utilizing the negotiated randomly generated symmetric key. Based at least in part on receiving the encrypted second message and the first assigned public key, the relay server may determine from stored associations that the first assigned public key is associated with the first client application. As a result, the relay server may determine that the second message is to be relayed (e.g., transmitted) to the first client application. In this way, the relay server may enable the first client application and the second client application to communicate with each other to set up the meshnet connection.

Based at least in part on setting up the meshnet connection, the first client application and the second client application may begin communicating encrypted data via the meshnet connection based at least in part on utilizing the negotiated parameters and the secure protocol. In a similar and/or analogous manner, the first client application may set up meshnet connections with a third client application installed in the third client application and with a fourth client application associated with the fourth client application. Also, in a similar and/or analogous manner, the second client application may set up meshnet connections with the first client application, the third client application, and the fourth client application. Further, in a similar and/or analogous manner, the third client application may set up meshnet connections with the first client application, the second client application, and the fourth client application. Finally, in a similar and/or analogous manner, the fourth client application may set up meshnet connections with the first client application, the second client application, and the third client application. Additional client applications that enter the mesh network may also set up meshnet connections with the other client applications included in the mesh network.

Further, based at least in part on setting up the meshnet connection, as shown by reference numeral 555, the first user device, the second user device, and the MSP control infrastructure 104 may enable communication functions in the mesh network. In some aspects, the first client application may establish a first support meshnet connection with the MSP control infrastructure 104 and the second client application may establish a second support meshnet connection with the MSP control infrastructure 104.

With respect to the first user device, the first client application and the MSP control infrastructure 104 may communicate with each other to set up the first support meshnet connection (e.g., an encrypted tunnel) for communicating encrypted data. To set up the first support meshnet connection, the first client application may utilize the MSP access information (e.g., infrastructure UDP IP address and/or infrastructure UDP port) to communicate with the MSP control infrastructure 104. In some aspects, the first client application and the MSP control infrastructure 104 may communicate to negotiate parameters (e.g., a symmetric encryption/decryption key) associated with the first support meshnet connection. In some aspects, the parameters may be randomly generated to provide optimized security to the communications. In an example, the first client application and the MSP control infrastructure 104 may negotiate a randomly generated symmetric key that is to be utilized by the first client application and the MSP control infrastructure 104 for encrypting and decrypting data communicated via the first support meshnet connection. In some aspects, the first client application and the MSP control infrastructure 104 may determine the randomly generated symmetric key based at least in part on utilizing the first assigned public key and/or a randomly generated number. Additionally, the first client application and the MSP control infrastructure 104 may utilize a secure protocol (e.g., Wireguard, IP sec, etc.) to communicate the data via the first support meshnet connection. Based at least in part on setting up the first support meshnet connection, the first client application and the MSP control infrastructure 104 may communicate encrypted data via the first support meshnet connection based at least in part on utilizing the negotiated parameters and the secure protocol.

In some aspects, the first support meshnet connection between the first user device and the MSP control infrastructure 104 may be dedicated for communicating current binding requests and responses. As a result, the MSP control infrastructure may determine that a communication received via the first support meshnet connection is a first current binding request. In some aspects, during operation within the mesh network (e.g., while communicating with the endpoints in the mesh network), the first client application may utilize the first support meshnet connection to transmit, to the MSP control infrastructure 104, a first current binding request to request the MSP control infrastructure 104 to determine a current first public UDP IP address (e.g., currently allocated public communication address) and/or a current first public UDP port (e.g., currently allocated public communication port) associated with the first device. A first NAT device associated with the first user device may receive and route the first current binding request to the MSP control infrastructure 104.

The first current binding request received by the MSP control infrastructure 104 may comprise a binding request packet similar to and/or analogous to the binding request packet discussed above with respect to FIG. 3A. The binding request packet may include, for example, a header indicating request public information. In some aspects, the request public information may indicate, among other information, an endpoint public address (e.g., first public UDP IP address) associated with the first user device as a source address (SA) and an endpoint public port (e.g., first public UDP port) associated with the first user device as a source port (SP). A payload associated with the binding request packet may include an encrypted request meshnet packet including, for example, a header indicating request meshnet information. In some aspects, the encrypted request meshnet packet may be encrypted utilizing the randomly generated symmetric key negotiated between the first user device and the MSP control infrastructure 104. A payload associated with the request meshnet packet may include information requesting the MSP control infrastructure 104 to determine the currently allocated public port associated (e.g., communication parameter) with the first user device.

A local meshnet port associated with the MSP control infrastructure 104 may receive the first current binding request. The local meshnet port may provide the first current binding request to a network stack associated with performing communication functions associated with the MSP control infrastructure 104. The network stack may include a plurality of layers including, for example, a physical layer, a data link layer, a network layer, a transport layer, a session layer, a presentation layer, and an application layer. In some aspects, the transport layer and/or the session layer and/or the presentation layer may be referred to as an intermediate layer before reaching the application layer. As discussed below in further detail, the network stack may be configured to enable communication functions in the mesh network.

The intermediate layer may receive the first current binding request via a communication (e.g., UDP IP packet including the first current binding request). Based at least in part on receiving the communication via the first support meshnet connection, the intermediate layer may determine that the communication is the first current binding request and/or that the intermediate layer is to determine the currently allocated public port associated with the first user device. As a result, as discussed elsewhere herein, the intermediate layer may determine that the endpoint public port (e.g., first public UDP port), which is indicated as the source port (SP) in the request public information, is the currently allocated public port associated with the first user device. Further, the intermediate layer may determine identification information to identify the currently allocated public port. In some aspects, the identification information may include a plurality of bits indicating a port number associated with the currently allocated public port. In some aspects, the identification information may include information indicating that the meshnet data associated with the first user device is to be transmitted to the currently allocated public port. Further, the intermediate layer may extract the encrypted request meshnet packet included in the payload of the first binding request packet.

The intermediate layer may transmit the encrypted request meshnet packet to the application layer via, for example, one or more interfaces between the intermediate layer and the application layer. Further, the intermediate layer may transmit the identification information to the application layer. In some aspects, the intermediate layer may append the identification information to the encrypted request meshnet packet. In some aspects, the intermediate layer may transmit the encrypted request meshnet packet and the identification information in a single payload to the application layer. In some aspects the intermediate layer may transmit the identification information and the encrypted request meshnet packet in separate payloads and/or separate communications. In some aspects, the intermediate layer may transmit the encrypted request meshnet packet and/or the identification information to the application layer via a socket associated with the application layer. In this way, the application layer may have access to the identification information.

Based at least in part on receiving or/determining the encrypted request meshnet packet and/or the identification information, the application layer (e.g., first client application) may utilize the randomly generated symmetric key, negotiated between the first user device and the MSP control infrastructure 104, to decrypt the encrypted request meshnet packet. The first client application may determine that the payload associated with the request meshnet packet includes information requesting the MSP control infrastructure 104 to determine the currently allocated public port associated with the first user device.

As a result, the first client application may determine a response meshnet packet, as shown in FIG. 3B. In an example, the response meshnet packet may include a header indicating response meshnet information. The response meshnet information may include information indicating, for example, an infrastructure meshnet address associated with the MSP control infrastructure 104 as the source address (SA), an infrastructure local meshnet port associated with the MSP control infrastructure 104 as the source port (SP), the first meshnet address associated with the first user device as the destination address (DA), and/or the first meshnet local port associated with the first user device as the destination port (DP). The first client application may include, in a payload associated with the response meshnet packet, the identification information received from the intermediate layer. Further, the first client application may encrypt the response meshnet packet utilizing the randomly generated symmetric key, negotiated between the first user device and the MSP control infrastructure 104. The first client application may transmit the encrypted response meshnet packet to the intermediate layer utilizing one or more sockets associated with the intermediate layer.

Based at least in part on receiving the encrypted response meshnet packet, the intermediate layer may determine a first binding response to the current first binding request. The first binding response may comprise a first binding response packet similar and/or analogous to the binding response packet discussed above with respect to FIG. 3B. In an example, the first binding response packet may include a header to indicate, for example, response public information. Further, the intermediate layer may include the encrypted response meshnet packet received from the first client application (or the application layer) in a payload associated with the first binding response packet.

In some aspects, the intermediate layer may transmit the entire binding request packet to the application layer via the socket associated with the application layer. In this case, the first client application associated with the application layer may be configured to perform one or more functions described above with respect to the intermediate layer including, for example, determining the identification information, determining the response meshnet packet, determining the first binding response packet, and/or transmitting the first binding response packet to the intermediate layer.

The intermediate layer may utilize the identification information to transmit the first binding response to the currently allocated public port associated with the first user device. The first NAT device may receive and route the first binding response to the first user device. In some aspects, a first local mesh net port, dedicated for communicating meshnet data associated with the first user device, may receive the first binding response. Based at least in part on analyzing the first binding response packet and the first response meshnet packet, the first user device may receive the identification information and determine the currently allocated public port associated with the first user device.

The intermediate layer may also transmit the first binding response to the respective currently allocated public ports associated with one or more other user devices (e.g., endpoints) in the mesh network including, for example, the second user device, the third user device, and/or the fourth user device. Based at least in part on analyzing the first binding response packet and the first response meshnet packet, the one or more other user devices may receive the identification information and determine the currently allocated public port associated with the first user device. The other user devices in the mesh network may utilize the identified currently allocated public port to continue to communicate meshnet data with the first user device. The first NAT device may accept and route such meshnet data communicated at the currently allocated public port to the first user device, and communication among the user devices in the mesh network may continue uninterrupted.

In some aspects, the intermediate layer may be configured to selectively transmit the first binding response. In an example, the intermediate layer may be configured to compare the determined identification information associated with the currently allocated public port with previous identification information associated with a previously allocated public port associated with the first user device. When a result of the comparison indicates that the identification information matches the previous identification information, the intermediate layer may determine that the currently allocated public port is the same as the previously allocated public port. In other words, the intermediate layer may determine that the first NAT device has not reallocated the public port associated with communicating meshnet data associated with the first device. In this case, the intermediate layer may select to refrain from transmitting the first binding response. When a result of the comparison indicates that the identification information fails to match the previous identification information, the intermediate layer may determine that the currently allocated public port is different from the previously allocated public port. In other words, the intermediate layer may determine that the first NAT device has reallocated the public port associated with communicating meshnet data associated with the first device. In this case, the intermediate layer may select to transmit the second binding response.

In some aspects, the first client application may periodically transmit the first current binding request and/or the second client application may periodically transmit the second current binding request to the MSP control infrastructure 104. Instances associated with periodically transmitting the first current binding request and/or the second current binding request may include, for example, every 15 seconds, every 25 seconds, every 55 seconds, every 55 seconds, every 60 seconds, every 120 seconds, etc.

Further, in some aspects, the first client application may refrain from transmitting, at a given instance, the first current binding request based at least in part on determining that a condition associated with transmitting the first current binding request is satisfied. In an example, the condition may be satisfied when the first client application determines that the first client application is actively communicating data with the second client application (or another respective client application associated with another user device in the mesh network) during the given instance (e.g., at a time associated with occurrence of the given instance). In another example, the condition may be satisfied when the first client application determines that the first client application does not anticipate communicating data with the second client application (or another respective client application associated with another user device in the mesh network) for a given interval of time, and that the given instance is to occur within the given interval of time.

In a similar and/or analogous manner as discussed above with the first user device, other endpoints (e.g., the second user device, the third user device, and/or the fourth user device) in the mesh network and the MSP control infrastructure 104 may enable communication functions in the mesh network. For instance, the other endpoints in the mesh network may set up respective support meshnet connections with the MSP control infrastructure 104 to enable communication functions in the mesh network, as discussed elsewhere herein. Additional user devices that enter the mesh network may also set up respective meshnet connections with the other user devices included in the mesh network, set up respective support mesh net connections with the MSP control infrastructure 104, and may enable communication functions in the mesh network, as discussed elsewhere herein.

In this way, by utilizing the systems and techniques discussed herein, the MSP control infrastructure 104 and the respective client applications may enable the user devices included in the mesh network to continue to communicate with each other without interruption and mitigate instances of inefficient transmissions and retransmissions of communications among the user devices. As a result, the MSP control infrastructure and the respective client applications may enable efficient utilization of user device resources (e.g., processing resources, memory resources, power consumption resources, battery life, or the like) and network resources (computational resources, network bandwidth, management resources, processing resources, memory resources, or the like) for performing suitable tasks associated with the secure mesh network.

As indicated above, FIG. 5 is provided as an example. Other examples may differ from what is described with regard to FIG. 5.

FIG. 6 is an illustration of an example process 600 associated with communication functions in a mesh network, according to various aspects of the present disclosure. In some aspects, the process 600 may be performed by a memory and/or a processor/controller (e.g., processing unit 110, processor 920) associated with an infrastructure device (e.g., MSP control infrastructure 104). As shown by reference numeral 610, process 600 may include receiving, at an infrastructure device from a first device in a mesh network, a request to determine a communication parameter associated with communicating meshnet data with the first device. For instance, the infrastructure device may utilize an associated communication interface (e.g., communication interface 970) with the associated memory and/or processor to receive, from a first device in a mesh network, a request to determine a communication parameter associated with communicating meshnet data with the first device, as discussed elsewhere herein.

As shown by reference numeral 620, process 600 may include configuring a transport layer included in a network stack associated with the infrastructure device to determine the communication parameter and to transmit identification information indicating the communication parameter to an application layer included in the network stack. For instance, the infrastructure device may configure a transport layer included in a network stack associated with the infrastructure device to determine the communication parameter and to transmit identification information indicating the communication parameter to an application layer included in the network stack, as discussed elsewhere herein.

As shown by reference numeral 630, process 600 may include configuring the application layer to determine a response including the identification information. For instance, the infrastructure device may configure the application layer to determine a response including the identification information, as discussed elsewhere herein.

As shown by reference numeral 640, process 600 may include transmitting, by the infrastructure device, the response to the first device. For instance, the infrastructure device may utilize the associated communication interface (e.g., communication interface 970) with the associated memory and/or processor to transmit the response to the first device, as discussed elsewhere herein.

Process 600 may include additional aspects, such as any single aspect or any combination of aspects described below and/or in connection with one or more other processes described elsewhere herein.

In a first aspect, in process 600, receiving the request includes receiving the request in encrypted form via a meshnet connection between the first device and the infrastructure device; and transmitting the response includes transmitting the response in encrypted form via the meshnet connection.

In a second aspect, alone or in combination with the first aspect, in process 600, configuring the application layer to determine the response includes configuring the application layer to determine a response meshnet packet having a payload that includes the identification information.

In a third aspect, alone or in combination with the first through second aspects, in process 600, configuring the application layer to determine the response includes configuring the application layer to encrypt a response meshnet packet, the encrypted response meshnet packet including the identification information.

In a fourth aspect, alone or in combination with the first through third aspects, in process 600, configuring the transport layer to determine the communication parameter includes configuring the transport layer to determine the communication parameter based at least in part on information included in the request.

In a fifth aspect, alone or in combination with the first through fourth aspects, in process 600, the communication parameter includes a currently allocated public port that is to be utilized by a second device included in the mesh network to communicate meshnet data with the first device.

In a sixth aspect, alone or in combination with the first through fifth aspects, in process 600, configuring the transport layer to transmit the identification information to the application layer includes configuring the transport layer to utilize a socket associated with the application layer to transmit the identification information.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with communication functions in a mesh network, according to various aspects of the present disclosure. In some aspects, the process 700 may be performed by a memory and/or a processor/controller (e.g., processing unit 110, processor 920) associated with an MSP control infrastructure (e.g., MSP control infrastructure 104). As shown by reference numeral 710, process 700 may include receiving, at an infrastructure device from a first device in a mesh network, a request requesting the infrastructure device to determine a communication parameter associated with the first device. For instance, the MSP control infrastructure may utilize a communication interface (e.g., communication interface 970) with the associated memory and/or processor to receive, from a first device in a mesh network, a request requesting the infrastructure device to determine a communication parameter associated with the first device, as discussed elsewhere herein.

As shown by reference numeral 720, process 700 may include configuring an application layer included in a network stack associated with the infrastructure device to: determine the communication parameter associated with communication of meshnet data with the first device, and determine a response including identification information indicating the communication parameter. For instance, the MSP control infrastructure may utilize the associated memory and/or processor to configure an application layer included in a network stack associated with the infrastructure device to: determine the communication parameter associated with communication of meshnet data with the first device, and determine a response including identification information indicating the communication parameter, as discussed elsewhere herein.

As shown by reference numeral 730, process 700 may include transmitting, by the infrastructure device, the response to the first device via a meshnet connection between the infrastructure device and the first device. For instance, the MSP control infrastructure may utilize the associated communication interface, memory, and/or processor to transmit the response to the first device via a meshnet connection between the infrastructure device and the first device, as discussed elsewhere herein.

Process 700 may include additional aspects, such as any single aspect or any combination of aspects described below and/or in connection with one or more other processes described elsewhere herein.

In a first aspect, in process 700, configuring the application layer to determine the communication parameter includes configuring the application layer to determine the communication parameter based at least in part on information included in the request.

In a second aspect, alone or in combination with the first aspect, in process 700, configuring the application layer to determine the response includes configuring the application layer to determine the response including an encrypted response meshnet packet including the identification information.

In a third aspect, alone or in combination with the first through second aspects, in process 700, the communication parameter includes a currently allocated public port to be utilized for communication of meshnet data with the first device.

In a fourth aspect, alone or in combination with the first through third aspects, in process 700, transmitting the response includes transmitting the response based at least in part on utilizing the communication parameter.

In a fifth aspect, alone or in combination with the first through fourth aspects, process 700 may include transmitting, by the infrastructure device, the response to a second device in the mesh network via a meshnet connection between the infrastructure device and the second device.

In a sixth aspect, alone or in combination with the first through fifth aspects, in process 700, receiving the request includes receiving the request periodically.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of an example process 800 associated with communication functions in a mesh network, according to various aspects of the present disclosure. In some aspects, the process 800 may be performed by a memory and/or a processor/controller (e.g., processing unit 110, processor 920) associated with an MSP control infrastructure (e.g., MSP control infrastructure 104). As shown by reference numeral 810, process 800 may include configuring an intermediate layer included in a network stack associated with an infrastructure device to: receive a request from a first device in a mesh network, the request requesting the infrastructure device to determine a communication parameter associated with communicating meshnet data with the first device; determine the communication parameter based at least in part on information included in the request; and transmit identification information identifying the communication parameter to an application layer included in the network stack. For instance, the MSP control infrastructure may utilize the associated memory and/or processor to configure an intermediate layer included in a network stack associated with an infrastructure device to: receive a request from a first device in a mesh network, the request requesting the infrastructure device to determine a communication parameter associated with communicating meshnet data with the first device; determine the communication parameter based at least in part on information included in the request; and transmit identification information identifying the communication parameter to an application layer included in the network stack, as discussed elsewhere herein.

As shown by reference numeral 820, process 800 may include configuring the application layer to determine a response including an encrypted meshnet packet including the identification information. For instance, the MSP control infrastructure may utilize the associated memory and/or processor to configure the application layer to determine a response including an encrypted meshnet packet including the identification information, as discussed elsewhere herein.

As shown by reference numeral 830, process 800 may include transmitting, by the infrastructure device, the response to a second device in the mesh network. For instance, the MSP control infrastructure may utilize the associated communication interface, memory, and/or processor to transmit the response to a second device in the mesh network, as discussed elsewhere herein.

Process 800 may include additional aspects, such as any single aspect or any combination of aspects described below and/or in connection with one or more other processes described elsewhere herein.

In a first aspect, in process 800, the intermediate layer includes a transport layer included in the network stack.

In a second aspect, alone or in combination with the first aspect, in process 800, the intermediate layer includes a session layer included between a transport layer and the application layer in the network stack.

In a third aspect, alone or in combination with the first through second aspects, in process 800, the intermediate layer includes a presentation layer included between a transport layer and the application layer in the network stack.

In a fourth aspect, alone or in combination with the first through third aspects, in process 800, the communication parameter includes a public port to be utilized by the infrastructure device or the second device for communicating the meshnet data with the first device.

In a fifth aspect, alone or in combination with the first through fourth aspects, process 800 may include configuring the application layer to determine the response includes configuring the application layer to encrypt the meshnet packet utilizing an encryption key negotiated between the infrastructure device and the first device.

In a sixth aspect, alone or in combination with the first through fifth aspects, in process 800, configuring the intermediate layer to receive the request includes configuring the intermediate layer to receive the request in encrypted form via a meshnet connection between the first device and the infrastructure device; and transmitting the response includes transmitting the response in encrypted form via the meshnet connection.

Although FIG. 8 shows example blocks of the process, in some aspects, the process may include additional blocks, fewer blocks, different blocks, or differently arranged blocks than those depicted in FIG. 8. Additionally, or alternatively, two or more of the blocks of the process may be performed in parallel.

As indicated above, FIG. 8 is provided as an example. Other examples may differ from what is described with regard to FIG. 8.

FIG. 9 is an illustration of example devices 900 associated with communication functions in a mesh network, according to various aspects of the present disclosure. In some aspects, the example devices 900 may form part of or implement the systems, servers, environments, infrastructures, components, devices, or the like described elsewhere herein (e.g., MSP control infrastructure, VPN server, etc.) and may be used to perform example processes described elsewhere herein. The example devices 900 may include a universal bus 910 communicatively coupling a processor 920, a memory 930, a storage component 940, an input component 950, an output component 960, and a communication interface 970.

Bus 910 may include a component that permits communication among multiple components of a device 900. Processor 920 may be implemented in hardware, firmware, and/or a combination of hardware and software. Processor 920 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 920 may include one or more processors capable of being programmed to perform a function. Memory 930 may include a random access memory (RAM), a read only memory (ROM), and/or another type of dynamic or static storage device (e.g., a flash memory, a magnetic memory, and/or an optical memory) that stores information and/or instructions for use by processor 920.

Storage component 940 may store information and/or software related to the operation and use of a device 900. For example, storage component 940 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 950 may include a component that permits a device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 may include a component that provides output information from device 900 (via, for example, a display, a speaker, a haptic feedback component, an audio or visual indicator, and/or the like).

Communication interface 970 may include a transceiver-like component (e.g., a transceiver, a separate receiver, a separate transmitter, and/or the like) that enables a device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

A device 900 may perform one or more processes described elsewhere herein. A device 900 may perform these processes based on processor 920 executing software instructions stored by a non-transitory computer-readable medium, such as memory 930 and/or storage component 940. As used herein, the term "computer-readable medium" may refer to a non-transitory memory device. A memory device may include memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 9 are provided as an example. In practice, a device 900 may include additional components, fewer components, different components, or differently arranged components than those shown in FIG. 9. Additionally, or alternatively, a set of components (e.g., one or more components) of a device 900 may perform one or more functions described as being performed by another set of components of a device 900.

As indicated above, FIG. 9 is provided as an example. Other examples may differ from what is described with regard to FIG. 9.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   configuring an intermediate layer included in a network stack associated with an infrastructure device to:
      receive a request from a first device in a mesh network, the request requesting the infrastructure device to determine a communication parameter associated with communicating meshnet data with the first device;
      determine the communication parameter based at least in part on information included in the request; and
      transmit identification information identifying the communication parameter to an application layer included in the network stack;
   configuring the application layer to determine a response including an encrypted meshnet packet including the identification information; and
   transmitting, by the infrastructure device, the response to a second device in the mesh network.

2. The method of claim 1, wherein the intermediate layer includes a transport layer included in the network stack.

3. The method of claim 1, wherein the intermediate layer includes a session layer included between a transport layer and the application layer in the network stack.

4. The method of claim 1, wherein the intermediate layer includes a presentation layer included between a transport layer and the application layer in the network stack.

5. The method of claim 1, wherein the communication parameter includes a public port to be utilized by the infrastructure device or the second device for communicating the meshnet data with the first device.

6. The method of claim 1, further comprising:
   configuring the application layer to determine the response includes configuring the application layer to encrypt a meshnet packet utilizing an encryption key negotiated between the infrastructure device and the first device.

7. The method of claim 1, wherein
   configuring the intermediate layer to receive the request includes configuring the intermediate layer to receive the request in encrypted form via a meshnet connection between the first device and the infrastructure device; and
   transmitting the response includes transmitting the response in the encrypted form via the meshnet connection.

8. An infrastructure device, comprising:
   a memory; and
   a processor communicatively coupled to the memory, the memory and the processor being configured to:
   configure an intermediate layer included in a network stack associated with an infrastructure device to:
      receive a request from a first device in a mesh network, the request requesting the infrastructure device to determine a communication parameter associated with communicating meshnet data with the first device;

determine the communication parameter based at least in part on information included in the request; and transmit identification information identifying the communication parameter to an application layer included in the network stack;

configure the application layer to determine a response including an encrypted meshnet packet including the identification information; and transmit the response to a second device in the mesh network.

9. The infrastructure device of claim 8, wherein the intermediate layer includes a transport layer included in the network stack.

10. The infrastructure device of claim 8, wherein the intermediate layer includes a session layer included between a transport layer and the application layer in the network stack.

11. The infrastructure device of claim 8, wherein the intermediate layer includes a presentation layer included between a transport layer and the application layer in the network stack.

12. The infrastructure device of claim 8, wherein the communication parameter includes a public port to be utilized by the infrastructure device or the second device for communicating the meshnet data with the first device.

13. The infrastructure device of claim 8, wherein, to configure the application layer to determine the response, the memory and the processor are configured to configure the application layer to encrypt a meshnet packet utilizing an encryption key negotiated between the infrastructure device and the first device.

14. The infrastructure device of claim 8, wherein to configure the intermediate layer to receive the request, the memory and the processor are configured to configure the intermediate layer to receive the request in encrypted form via a meshnet connection between the first device and the infrastructure device; and to transmit the response, the memory and the processor are configured to transmit the response in the encrypted form via the meshnet connection.

15. A non-transitory computer-readable medium configured to store instructions, which when executed by a processor associated with an infrastructure device, cause the processor to:

configure an intermediate layer included in a network stack associated with an infrastructure device to:

receive a request from a first device in a mesh network, the request requesting the infrastructure device to determine a communication parameter associated with communicating meshnet data with the first device;

determine the communication parameter based at least in part on information included in the request; and transmit identification information identifying the communication parameter to an application layer included in the network stack;

configure the application layer to determine a response including an encrypted meshnet packet including the identification information; and transmit the response to a second device in the mesh network.

16. The non-transitory computer-readable medium of claim 15, wherein the intermediate layer includes a transport layer included in the network stack.

17. The non-transitory computer-readable medium of claim 15, wherein the intermediate layer includes a session layer included between a transport layer and the application layer in the network stack.

18. The non-transitory computer-readable medium of claim 15, wherein the intermediate layer includes a presentation layer included between a transport layer and the application layer in the network stack.

19. The non-transitory computer-readable medium of claim 15, wherein the communication parameter includes a public port to be utilized by the infrastructure device or the second device for communicating the meshnet data with the first device.

20. The non-transitory computer-readable medium of claim 15, wherein, to configure the application layer to determine the response, the processor is configured to configure the application layer to encrypt a meshnet packet utilizing an encryption key negotiated between the infrastructure device and the first device.

* * * * *